United States Patent [19]

Firth

[11] 4,168,942

[45] Sep. 25, 1979

[54] EXTRUSION APPARATUS AND METHOD

[75] Inventor: Francis G. Firth, Los Angeles, Calif.

[73] Assignee: Applied Plastics Co., Inc., El Segundo, Calif.

[21] Appl. No.: 929,650

[22] Filed: Jul. 31, 1978

[51] Int. Cl.² ............................................. B29F 3/01
[52] U.S. Cl. ............................. 425/144; 222/146 H;
222/252; 222/319; 222/413; 366/89; 366/323;
425/208; 425/376 A; 425/376 B; 425/378 R
[58] Field of Search ................... 425/207, 208, 376 B,
425/378, 144, 376 R, 376 A, 378 R; 222/252,
319, 413, 146 H; 214/300, 304, 309, 310

[56] References Cited

U.S. PATENT DOCUMENTS

| 1,591,604 | 7/1926 | Bienenstok | 222/320 |
| 2,080,856 | 5/1937 | Thomas | 222/320 |
| 3,043,484 | 7/1962 | Jolly | 222/146 HA |

Primary Examiner—W. E. Hoag
Attorney, Agent, or Firm—William W. Haefliger

[57] ABSTRACT

A cohesive, non-flowable, plastic mass which is difficult to handle in bulk form is subjected to removal from a container and guided flow into a screw conveyor, compression in the conveyor, and controlled heat input and withdrawal while transported by the conveyor to facilitate ultimate extrusion.

19 Claims, 4 Drawing Figures

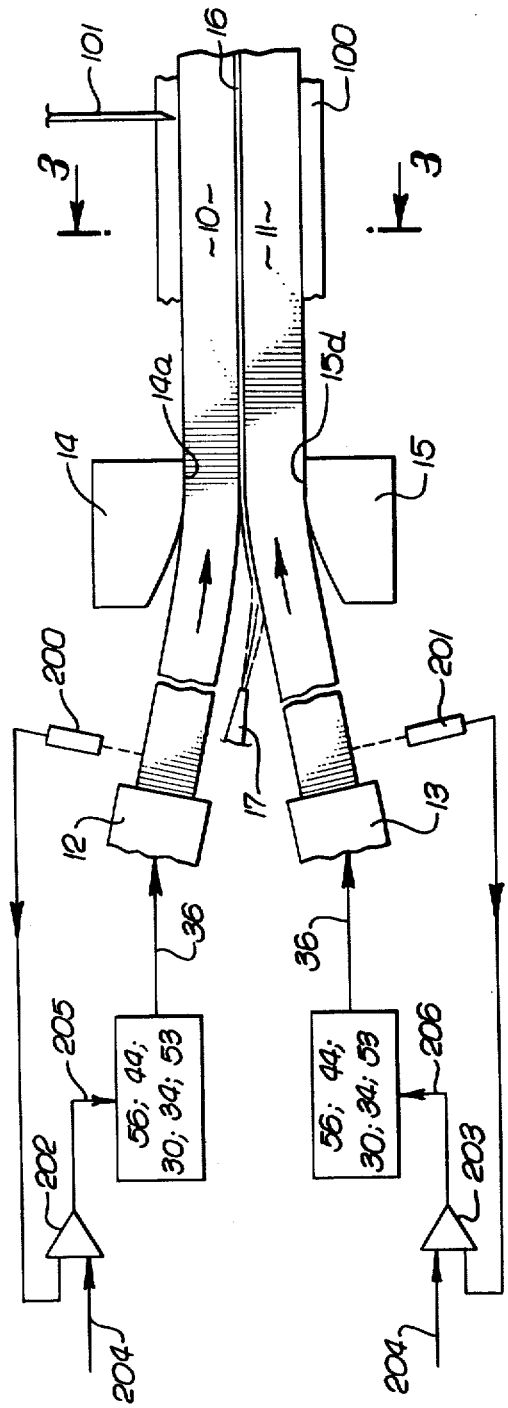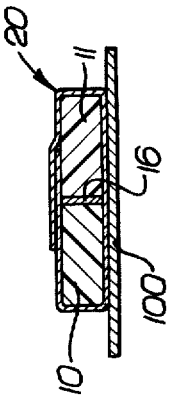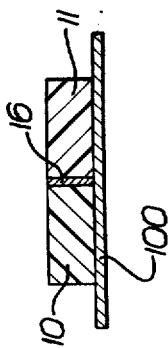

EXTRUSION APPARATUS AND METHOD

BACKGROUND OF THE INVENTION

This invention relates generally to extrusion of cohesive, non-flowable, plastic masses, which present difficult handling in bulk form, and where the extruded shape required is of a precise cross section.

Typical materials that are difficult to produce in useful discrete amounts, include ribbons, or bar shapes of mineral filled, or unfilled resinous materials such as two-component epoxy resins, rubber-like compounds such as polybutadiene rubber, silicones, polysulfides, hot melt adhesives, polyurethane, reactive caulks, sealants and the like. The general characteristics of such materials include the following.

(a) They are sticky, and self-adhesive to themselves, and non-pourable.
(b) They exhibit strong adhesion to any surfaces they touch.
(c) They are difficult to handle in bulk, such as when loading a charge into an extruder device.
(d) They are in general non-flowable without added force.

SUMMARY OF THE INVENTION

It is a major object of the invention to provide method and apparatus for achieving fine control of plastic extrusion, and in a simple, inexpensive manner to handle the material supplied from storable, low-cost containers.

As a general rule, typical sticky, viscous materials contain high polymeric substances, that display non-neutonian viscosity characteristics. Nevertheless the viscosity, or plasticity, is affected by temperature. In other words, resistance to pressure induced movement is reduced, by raising the temperature. Consequently, manipulation of the plastic flow of a mass of the material, is controllable by providing suitable means of heating, or cooling, in particular zones of the equipment, as with conventional thermoplastic extrusion.

Generally, the problem involves the controlled extrusion of a small cross section of material supplied from a storage device containing sufficient material, for example preferably for from four to eight hours of operation, and which may amount to 500 to 1000 lbs. in weight, as a convenient module. A suitable storage container could be a straight sided, cylindrical drum, similar to a heavy duty, open top, oil drum, of 55 gallons normal capacity. The plastic mass would typically be mixed in a jacketed, double sigma, heavy duty mixer, preferably under elevated temperature and vacuum, and dumped into the cylindrical storage drum, while hot, to be thereafter supplied from the drum to the extruder. By covering the top of the drum, a practical storage means is provided.

In accordance with the invention, the transfer of stored material involves use of a circular, thick metal plate, whose diameter is slightly smaller than the inner dimension of the storage drum, and which is provided with flexible sealing means to fit the inner diameter of the drum, and also with heating means. The temperature controlled disc is inserted into the storage drum, and pressure is then applied to the plastic mass in the drum as by mechanical means such as with hydraulic, pneumatic, or other devices. The stored material is thereby displaced or extruded out of the center hole in the disc. As will appear, heat may be transferred to the contents of the drum to enhance the flow of the product. This then provides an efficient method and means of transferring product from a bulk storage, to the extruder device.

Should a relatively large cross section of product be desired, it is possible to supply the product to the extruder directly from the mixing equipment, via suitable pumping, screw or similar delivery apparatus. The pressure plate device, however, can be made to operate on demand, through back pressure derived from the extruder-controlled output rate, which is of particular usefulness.

Inasmuch as the sticky masses of interest are not flowable, and continuous extrusion is desired, the use of screw extrusion means is desirable. In this regard, the need for small cross-section extrusion product would normally require a small screw diameter, and shallow flight sections. However, this situation involves considerable shear in the material, and high friction losses, which result in undesirable heat build-up; also, controllable extrusion rate is lost, because of possible high fluidity of the product, at the screw extruder-barrel interface, which does not provide a suitable seal. If the barrel is provided with a cooling jacket, the necessary seal is provided, but the necessary fluidity required for product transfer along the flight cavity is lost.

Accordingly and in accordance with another aspect of the invention, provision is made to controllably heat the screw, and cool the extruder wall, to provide a positive seal at the edge of the screw flights. Because of the high friction characteristics of sticky, high polymeric materials, it is desirable to provide minimum shear forces between the extruder wall and the screw flight edge. By increasing the diameter of the screw, a low rotational speed will produce a relatively large amount of product. If the inner diameter of the screw is tapered, with the small diameter at the exit end, an increase in the pressure and rate of extrusion will be gained. A further advantage will be in the reduction of screw speed for a given output, and better flow control.

It is common place in plastic extrusion equipment to change the pitch of a constant diameter screw, in order to gain pressure increase at the die. Such known designs of screw profile produce enhancement of pressure, and flow, at the extrusion nozzle, but with undesirably increased shear, and subsequent product temperature increase. In accordance with the present invention, the use of a temperature controlled barrel, and a heated screw, where the temperature of the barrel is kept lower than that of the screw, also helps maintain product pressure, and flow, through shear reduction, at the flight outer edge, and at the barrel bore. The extrusion nozzle can be provided with means for heating or cooling, and be either located on the barrel at the large end of the screw taper, or at some extension thereof.

These and other objects and advantages of the invention, as well as the details of an illustrative embodiment, will be more fully understood from the following description and drawings, in which:

DRAWING DESCRIPTION

FIG. 2 is a plan view of an extrusion process involving extrusion of two ribbons;

FIG. 3 is a section on lines 3—3 of FIG. 2; and

FIG. 4 is a view like FIG. 3, but after wrapping of the product;

DETAILED DESCRIPTION

Figure 1:
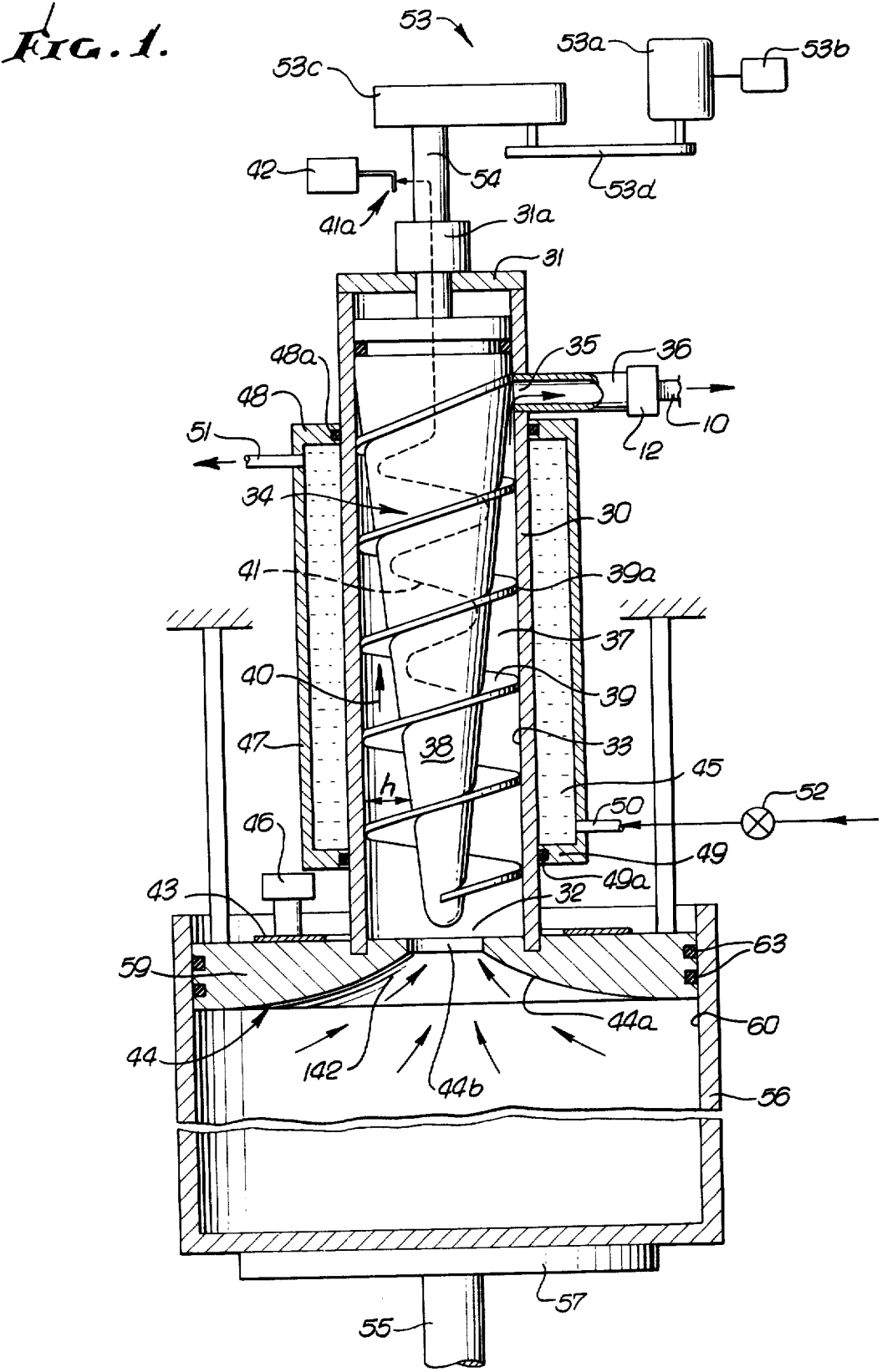
FIG. 1 is an elevation, in section, showing screw feeding of the mass being extruded.

Referring to FIG. 1, apparatus is shown to extrude viscous material, as referred to. Such apparatus includes an extrusion cylinder as at 30 which may advantageously extend upright, and have a top cover 31, an open lower entrance end at 32, and a uniform diameter bore 33. A screw conveyor 34 is rotatable in the cylinder to advance material therein toward a side outlet 35 from the cylinder. Outlet 35 communicates via duct 36 with extrusion head or die 12, from which product is continuously extruded in a relatively narrow band or ribbon 10. Other extrudate shapes are of course possible.

It is a feature of the cylinder and screw conveyor that the material receiving space 37 formed between the conveyor and the cylinder bore decreases in area in the direction of material advancement in the cylinder by the conveyor. For that purpose, the conveyor may have a core 38 and a screw flight 39 mounted on the core, the latter flaring in the direction of materials advancement, i.e. the core may be frusto-conical, as shown. As a result, the radial distance "h" between the core and bore 33 constantly decreases in the direction of material advancement indicated by arrow 40.

The flight 39 has a spiraling outer edge 39a which slidably engages the bore 33. Temperature control of the material, conveyor and cylinder assures that a seal is maintained at the flight edge. In this regard, the core 38 may be heated as by an electrical heating element 41 connected via slip connection 41a with a current source and control indicated at 43. Heat is also transferred to the material at location 142 where it is channeled toward entrance 32. For that purpose, suitable heating means as for example electrical heating element or panel 43 may be located in contact with funnel 44, which may have disc shape, with a side 44a which tapers toward disc outlet 44b and cylinder entrance end 32 to effect materials channeling toward 44b and 32. A current source and control for element 43 is indicated at 46.

Heat may be controllably withdrawn from the cylinder 30 as via fluid cooling media 45 flowing endwise through jacket 47 and in contact with the cylinder outer wall. The jacket surrounds the cylinder, and has ends 48 and 49 with seals 48a and 49a engaging the cylinder. Inlet and outlet ducts are provided at 50 and 51, and a control valve at 52 to control the flow and heat withdrawal.

A drive to slowly rotate the screw conveyor is shown at 53, and may include variable speed motor 53a with a speed control 53b, a speed reducer 53c, and a belt drive 53d between the motor and reducer. The reducer is connected with a conveyor shaft 54 extending through cylinder end 31 and through stuffing box 31a. Frictional heating of the material by frictional engagement with the conveyor is also a factor to be dealt with, insofar as desired heating of the material is concerned. The objective is to assure desired heating and pressurization of the materials for ultimate extrusion through head 12, to produce extrudate 10. "Fine" control of material pressure is achieved due to the controlled decrease in area of the space between the conveyor and cylinder in direction 40, as the material is fed toward outlet 35, and also due to controlled rotation of the conveyor. "Coarse" control of pressurization of the material at entrance end 32 of the cylinder is achieved by means to be described below. The fact that the outer edge 39a of screw flight 39 closely fits the bore 33 assures "fine" control of pressurization, such desired fitting being controlled by temperature control of the conveyor and cylinder, and of the mass of material as described above; i.e. controlled heating of the flight 39 and cooling of the cylinder results in temperature induced flowability of the mass of material by the screw conveyor, together with increased viscosity of the material adjacent bore 33 due to cooling, to provide a seal facilitating desired pressurization for extrusion purposes.

FIG. 1 also shows the provision of a material supply container, such as 55 gallon drum 56 from which the lid has been removed. The drum is placed on a platform 57 which is subjected to controllable elevation, as by means such as hydraulically powered shaft 58. The annular piston portion 59 of disc 44 is received in the drum and slidably engages its bore 60. Note annular seals at 63. Accordingly, as the supply drum or container is slowly elevated relative to fixed piston 59, the materials are fed toward the disc 44 and channeled by surface 44a toward entrance 32, with "coarse" pressurization as referred to above.

Two such discs and drums may be employed to deliver materials into extrusion cylinders as at 30 so as to be conveyor advanced toward two extruder heads, as at 12 and 13 in FIG. 2. The materials being fed may be those referred to above, or other putty-like materials such as viscous plastic compounds which react when kneaded together.

In operation, the following steps are performed:

(a) the material is fed toward the entrance 32 to the zone in the cylinder within which the conveyor is rotated, (b) the material is displaced in that zone toward outlet 35, and to finely control increased pressurization as the material is displaced toward that outlet, and (c) heat is transferred into the material to increase its plasticity and flow characteristics, and heat is withdrawn from the material as it is displaced toward the outlet to enhance finely controlled pressurization of the material for ultimate extrusion.

The invention enables multiple extrusions to a common carrier and in a precise mass relationship, in spite of different temperature/flow characteristics of the individual components. For a given set of temperature parameters, or for a particular set of materials, the extrusion rate is proportional to the screw speed. With suitable flow instrumentation, and variable speed screw drive mechanisms, a feed back loop can be established, which will proportion the flow rate of one, or multiple extruders, to a master unit. This solves a particularly difficult problem of laying down ribbons of mutually reactive compounds on a common carrier base where stoichiometorically correct ratios are desired for specific and/or equal lengths.

The invention is of particular utility as respects extrusion of materials as disclosed in my co-pending application Ser. No. 747,612. In this regard, and referring to FIGS. 2–4, two plastic masses are extruded longitudinally as bands 10 and 11, as by extrusion heads 12 and 13. Such masses typically have a putty-like consistency, and they are displaced laterally by guides 14 and 15 into close side-by-side relation, the guides having guide surfaces 14a and 15a as shown. A common, moving support for the masses may take the form of a belt 100 (not shown in FIG. 2, and seen in FIG. 3). A cut-off knife appears at 101.

A thin flexible barrier 16 is typically interposed between the mutually reactive masses or bands, and is provided in the form of a neutral film, which may be applied in liquid form to an edge portion of one mass, as for example band 11, closest to band 10. Note for example the spray application at 17. A wrap for the two bands appears at 20 in FIG. 4. The masses are kneaded together at such time as their interraction is desired.

FIG. 2 also shows extrusion rate sensors 200 and 201 optically (or by other means) sensing the extrusion rates from heads 12 and 13, it being desired that the two ribbons 10 move at the same rate. The outputs from the two sensors are compared at comparators 202 and 203 with pre-set inputs 204. The comparator outputs 205 and 206 are employed to control the variable speed drives for the feed screws 34.

I claim:

1. For use in extruding viscous material, apparatus comprising
   (a) a disc having a through opening defining an outlet at one side of the disc, there being a material funneling surface at the opposite side of the disc and tapering toward said outlet,
   (b) the disc having an annular periphery sized for relative travel adjacent the bore of a container from which such material is displaced under pressure relatively toward said surface to be channeled through said opening, and
   (c) means to control the temperature of the material being displaced.

2. Apparatus as defined in claim 1 wherein said means (c) includes material heating means associated with said disc.

3. The apparatus as defined in claim 1 including materials extrusion means in communication with said disc outlet and operable to pressurize and displace the material displaced through said opening, for ultimate extrusion through a die.

4. Apparatus as defined in claim 1 including said container receiving said disc, there being annular means on the disc to provide a seal between the disc and the container bore.

5. Apparatus as defined in claim 4 wherein the disc is fixed in position, and including means engaging the container to displace the container relatively toward the disc.

6. Apparatus as defined in claim 1 wherein said extrusion means comprises:
   (a) an extrusion cylinder having a bore and an outlet,
   (b) a screw conveyor rotatable in the cylinder to advance material therein and toward said outlet,
   (c) the material receiving space formed between the conveyor and the cylinder bore decreasing in the direction of material advancement in the cylinder by the conveyor, and
   (d) heat transfer means to controllably transfer heat to maintain a viscosity controlled material seal between the conveyor and the cylinder bore.

7. Apparatus as defined in claim 6 wherein the screw conveyor has a core and a screw flight mounted on the core, the core flaring in the direction of materials advancement.

8. The apparatus of claim 7 wherein the cylinder extends upright and has a uniform diameter bore.

9. The apparatus of claim 8 including an extrusion die in material receiving communication with said cylinder.

10. Apparatus as defined in claim 6 wherein said heat transfer means includes means to controllably heat the screw conveyor.

11. The apparatus of claim 10 wherein said heat transfer means includes cylinder cooling means having a coolant fluid jacket extending about the cylinder to cool the cylinder extent about the conveyor.

12. The combination of claim 7 including a second apparatus as defined in claim 7, there being extrusion heads to which materials are delivered from said cylinder outlets, said heads located to simultaneously extrude the materials as two ribbons directed into close side-by-side relation.

13. The combination of claim 12 wherein the first ribbon consists essentially of an epoxy material formed by mixing together filler, thixotropic material and reactive epoxy resin having an epoxy equivalent weight of 190 or less.

14. The combination of claim 13 wherein the second ribbon consists essentially of a reactive material formed by mixing a polyfunctional amine and filler.

15. Apparatus to extrude viscous material, comprising
   (a) an extrusion cylinder having a bore and an outlet,
   (b) a screw conveyor rotatable in the cylinder to advance material therein and toward said outlet,
   (c) the material receiving space formed between the conveyor and the cylinder bore decreasing in the direction of material advancement in the cylinder by the conveyor, and
   (d) heat transfer means to controllably transfer heat to maintain a viscosity controlled material seal between the conveyor and the cylinder bore.

16. Apparatus as defined in claim 15 wherein the screw conveyor has a core and a screw flight mounted on the core, the core flaring in the direction of materials advancement.

17. Apparatus as defined in claim 15 wherein said heat transfer means includes means to controllably heat the screw conveyor.

18. The apparatus of claim 17 wherein said heat transfer means includes cylinder cooling means having a coolant fluid jacket extending about the cylinder to cool the cylinder extent about the conveyor.

19. The apparatus of claim 18 wherein the cylinder extends upright and has a uniform diameter bore.

* * * * *